US011819029B2

(12) United States Patent
Rauch et al.

(10) Patent No.: US 11,819,029 B2
(45) Date of Patent: Nov. 21, 2023

(54) METHOD FOR FORMING RINGS, MORE PARTICULARLY DOUGH RINGS, FROM DOUGH OR OTHER MASSES

(71) Applicant: König Maschinen Gesellschaft m.b.H., Graz (AT)

(72) Inventors: Eduard Rauch, St. Margarethen (AT); Florian Rossmann, Gralla (AT); Wolfgang Staufer, Vienna (AT); Hannes Stelzer, Lannach (AT)

(73) Assignee: KÖNIG MASCHINEN GESELLSCHAFT M.B.H., Graz (AT)

( * ) Notice: Subject to any disclaimer, the term of this patent is extended or adjusted under 35 U.S.C. 154(b) by 171 days.

(21) Appl. No.: 15/733,943

(22) PCT Filed: May 31, 2019

(86) PCT No.: PCT/AT2019/060182
§ 371 (c)(1),
(2) Date: Dec. 1, 2020

(87) PCT Pub. No.: WO2019/232562
PCT Pub. Date: Dec. 12, 2019

(65) Prior Publication Data
US 2021/0219558 A1 Jul. 22, 2021

(30) Foreign Application Priority Data
Jun. 6, 2018 (AT) .............. A 50454/2018

(51) Int. Cl.
*A21C 11/00* (2006.01)
*A21C 11/12* (2006.01)
*A21C 11/06* (2006.01)

(52) U.S. Cl.
CPC ............ *A21C 11/002* (2013.01); *A21C 11/06* (2013.01); *A21C 11/12* (2013.01)

(58) Field of Classification Search
CPC ..... A21C 11/004; A21C 11/006; A21C 11/06; A21C 11/002; A21C 11/12; B29C 43/14; B29C 2043/3628
See application file for complete search history.

(56) References Cited

U.S. PATENT DOCUMENTS

| 1,236,620 | A | | 8/1917 | Storment et al. | |
| 1,578,761 | A | * | 3/1926 | Rondolin | ............... A21C 11/10 426/503 |

(Continued)

FOREIGN PATENT DOCUMENTS

DE    102013104716 A1    11/2014

OTHER PUBLICATIONS

Internation Search Report and Written Opinion of the International Searching Authority and Translation of International Search Report; Application No. PCT/AT2019060182; Completed: Aug. 27, 2019; dated Sep. 4, 2019; 8 Pages.

(Continued)

*Primary Examiner* — Emmanuel S Luk
(74) *Attorney, Agent, or Firm* — Husch Blackwell LLP (57) ABSTRACT

The present teaching relates to a method for forming rings from dough or other masses. A mass portion is positioned into a forming device on an abutment under a pressing device, wherein the pressing device has a centering ring, a displacement rod, a cut-out ring and a press ram. The centering ring is placed on the abutment, wherein the mass portion is laterally enclosed by means of the centering ring and is pressed by means of the press ram against the abutment into an approximately cylindrical form with a uniform thickness. A core hole is made in the mass portion by means of the displacement rod, so that a thin core of the mass portion remains between the abutment and the displacement rod. The core is punched out by the cut-out ring, (Continued)

and the press ram is lifted off the mass portion formed into a ring.

5 Claims, 5 Drawing Sheets

(56) References Cited

U.S. PATENT DOCUMENTS

| | | | | | |
|---|---|---|---|---|---|
| 2,487,271 | A | * | 11/1949 | Petri | A21C 11/002 83/123 |
| 2,595,305 | A | * | 5/1952 | Scott | A21C 11/10 83/167 |
| 2,612,853 | A | | 10/1952 | Bale, Jr. | |
| 2,695,570 | A | * | 11/1954 | Helland | A21C 11/002 425/351 |
| 2,779,097 | A | * | 1/1957 | Frazier | A21C 11/002 D7/672 |
| 2,983,233 | A | * | 5/1961 | Herrington | A21C 11/163 30/316 |
| 3,052,196 | A | * | 9/1962 | Gilmore | A21C 11/163 285/302 |
| 3,088,354 | A | * | 5/1963 | Voorhees | A21C 11/002 83/217 |
| 3,101,021 | A | * | 8/1963 | Johnson | A21C 11/002 83/99 |
| 3,248,980 | A | * | 5/1966 | Downing | A21C 11/002 83/99 |
| 3,335,678 | A | * | 8/1967 | Katz | A21C 11/00 425/408 |
| 3,396,677 | A | * | 8/1968 | Adams | A21C 11/166 425/191 |
| 3,459,140 | A | * | 8/1969 | Gaskell | A21C 7/04 425/195 |
| 3,603,270 | A | * | 9/1971 | Tangel | A21C 9/066 425/513 |
| 4,075,359 | A | * | 2/1978 | Thulin | A21C 11/12 425/291 |
| 4,592,916 | A | * | 6/1986 | Akesson | A21C 11/006 425/398 |
| 5,162,119 | A | * | 11/1992 | Pappas | A21C 11/04 101/106 |
| 5,176,922 | A | * | 1/1993 | Balsano | A21C 11/006 425/398 |
| 5,306,133 | A | * | 4/1994 | Dayley | A21C 11/04 425/290 |
| 2012/0207899 | A1 | | 8/2012 | Serebryany et al. | |
| 2020/0146301 | A1 | * | 5/2020 | Meier | A21C 11/02 |

OTHER PUBLICATIONS

International Preliminary Report of Patentability; Application No. PCT/AT2019060182; dated Sep. 18, 2020; 11 Pages.

* cited by examiner

METHOD FOR FORMING RINGS, MORE PARTICULARLY DOUGH RINGS, FROM DOUGH OR OTHER MASSES

TECHNICAL FIELD

The present teaching relates to a method for forming rings, doughnuts, bagels, choux pastry rings, cinnamon rings and other rings as well as a forming device for forming rings, doughnuts, bagels, choux pastry rings, cinnamon rings and other rings.

BACKGROUND

In various methods and devices for forming rings known from the prior art, dough pieces are shaped in individual steps at a number of processing stations and then the core hole characteristic for rings is punched out. In devices known in the prior art, dough pieces are moved along a conveyed belt and transported from one processing station to the next. At individual processing stations, a circular shape is imprinted on the dough piece in steps, so that the dough is re-shaped by means of varying molds and finally the dough for the core hole is punched out of the dough piece by means of a punch-out ram.

A disadvantage of the methods and devices known from the prior art is that a number of different processing stations are required, and that the shape and uniformity of the produced rings are negatively affected by positioning errors at the individual stations. In addition, as a result of punching out the ring hole and/or removing dough from the core hole, a high percentage of dough is extracted, resulting in a considerable loss of dough. Likewise, with the methods and devices known from the prior art, it often occurs that, in cutting out the core hole, the so-called skin of the dough is damaged, so that, upon the subsequent deep frying of the rings, grease or oil can penetrate into the dough and impairs the quality and flavor of the dough

SUMMARY

It is therefore one object of the present teaching to provide a method and a device for forming rings, which on the one hand make high-quality processing and production of rings possible and simultaneously reduce spoilage or waste of dough in the production of rings.

This object is fulfilled by means of a method with the following features. It is thereby foreseen that in a first step a) the centering ring is placed on the abutment, and thus the mass portion, in particular the dough piece, is laterally enclosed by means of the centering ring and is pushed by means of a press ram against the abutment into an approximately cylindrical form with uniform thickness and preferably the mass of the mass portion, in particular the dough piece, is kept uniform, that in a second step b) by means of the displacement rod a core hole, more particularly a centrally arranged core hole, is made in the mass portion, particularly the dough piece, wherein the displacement rod penetrates into the mass portion, particularly the dough piece, to a lower value than the thickness of the mass portion, particularly the dough piece, pre-pressed in the first step a), so that a thin core of the dough piece remains between the abutment and the displacement rod, that in a third step c) the core is punched out by the cutout ring, and that in a fourth step d) the press ram is lifted off the mass portion, particularly the dough piece, that is formed into a ring, wherein more particularly the centering ring is opened and/or lifted off the abutment.

As a result of the individual steps of the inventive method it is possible to reduce the dough residue to a minimum and to clearly raise the quality of the produced ring. Owing to the centering ring and the arrangement of the press ram, the ring is pre-shaped and makes it possible for the displacement rod to penetrate into the dough piece, and for the dough punched out according to the prior art not to be removed from the dough piece but rather to be displaced. Thanks to the displacement by means of the displacement rod, which draws the skin of the dough piece with it, this skin of the dough is closed again or not damaged, and thus has a positive impact on the structure of the formed ring. With the help of the displacement of the dough from the area of the core hole, it is, in addition, possible thereafter to remove only a small portion of the dough with the cut-out ring, thus simultaneously achieving a homogeneous, closed skin or surface of the formed ring. An additional advantage is that flat-pressed dough pieces, that is, those upward pre-pressed ones, as well as non-pre-pressed dough pieces, can be formed.

Further advantageous configurations of the inventive method are defined in greater detail through the features herein.

To improve the mass distribution or thickness of the dough, it can be arranged that in the second step b) during the penetration of the displacement rod, the centering ring is continuously opened and/or the press ram is continuously withdrawn, so that the displaced volume of the mass portion, particularly of the dough piece, is displaced into the space vacated by the centering ring. As a result of the continuous opening of the centering ring, a space is freed up in the second step, in which the dough displaced from the core hole can expand. As a result of the freed space, the thickness and mass distribution inside the shaped ring is maintained without causing differences in mass distributions or different densities along the width or thickness of the ring. In addition, owing to the freed space, positive flow characteristics are made possible during the forming of the core hole without any portions of the dough becoming unintentionally thickened.

To advantageously separate or remove the core, left free after the second step b), from the formed ring, it is possible to foresee that in the third step c) the core is lifted into the cut-out ring or that the core is removed from the completely formed ring after being punched out of the completely formed ring, in particular into a gap situated between two conveyor belts at a distance from one another, or that the core is drawn in by a suction device or is ejected by a belt strap or the conveyor belt.

To make more rapid industrial production possible, it can be foreseen that the abutment is configured as a conveyor belt on which the dough piece is transported during the forming process, so that the pressing device is propelled with the conveyor belt at its same speed, or that the pressing device is configured as a drum former and is also moved at the speed of the conveyor belt. Thanks to the joint motion of the pressing device and the conveyor belt, it is possible to arrange several dough pieces in a row on a conveyor belt, which can then be processed individually and thus a greater number of rings can be produced in less time.

Advantageously it can be arranged that the mass portions, particularly dough pieces, formed by this method are round piping rings, wherein the mass portions, particularly dough pieces, inserted in the forming device are flat-pressed or pre-pressed or spherical mass portions, particularly dough pieces, and/or that the press ram is moved in synchronization with the displacement rod as well as the cut-out ring, so that the mass portion is formed into a disk.

An additional object of the present teaching is to provide a forming device for forming rings, particularly dough rings, which make it possible to form rings, particularly dough rings, in a few steps and thereby to achieve a high quality and a minimal degree of residue of dough.

This object is achieved in that the press ram comprises a recess, that the pressing device in addition comprises a displacement rod to insert the core hole of the ring, wherein the displacement rod is arranged displaceably in the recess of the press ram in its displacement direction with respect to the press ram, that a cut-out ring is arranged between the press ram and the displacement rod and, in particular, surrounding the displacement rod, wherein the press ram, the displacement rod and the cut-out ring can be adjusted independently of one another in the direction of the abutment, and that the pressing device comprises a centering ring, particularly a centering ring in multiple parts, to limit the diameter of the formed ring, which constitutes the outer contour of the mass portion, particularly the dough piece.

As a result of the arrangement of the displacement rod of the cut-out ring and of the centering ring inside the pressing device, it is possible to execute the individual processing steps in forming a ring at a single station, thereby omitting the centering of the forming tools at individual stations with respect to the dough piece. Thus a simpler, and especially more cost-beneficial, processing of dough becomes possible, which in addition ensures the high quality of produced rings.

Additional advantageous configurations of the inventive forming devices are defined in greater detail herein.

Advantageously, the centering ring can be configured in one or more parts, particularly in two parts, wherein the centering ring can be switched between an opened and closed condition without intermediate stages, wherein, with the centering ring in opened position, the parts of the centering ring are at a distance from one another perpendicularly to the displacement direction and wherein the parts of the centering ring, in the closed position, are contiguous with one another or are at a lesser distance than in opened condition and form a forming ring for the outer contour of the mass portion, particularly the dough piece.

Advantageously here, the centering ring, the displacement rod, the cut-out ring and the press ram can be arranged concentric to one another, particularly in the axis of the recess of the press ram.

To be able to form rings easily along a conveyor belt, it can be foreseen that the abutment is configured as a conveyor belt, on which the dough piece can be advanced, wherein the pressing device, the centering ring, the displacement rod, the cut-out ring and the press ram can be moved in the direction of the forward motion of the conveyor belt at the speed of the conveyor belt.

Advantageously, the abutment can be configured as a conveyor belt, conveyor bar or pressure cup or a number of transport bars, pressure cups or as multiple-surface transport drums.

To further improve synchronization of the centering ring with the press ram, it can be foreseen that the centering ring is moveable with the press ram along the latter's direction of movement, in particular along with the press ram.

It is especially simple to provide for parallel industrial production of rings by positioning a number of pressing devices, each of similar configuration, along the length and/or the width of the abutment, particularly along the length and/or the width of the conveyor belt. Owing to the arrangement of several pressing devices along a conveyor belt or along the abutment, it is possible in a single step to provide a high number of rings parallel or in a row and thus to achieve a high flow rate of rings or dough pieces through a production station.

An advantageous configuration is achieved in that the forming device comprises a main ram, which can be moved in a pressing direction, particularly perpendicular to the abutment, wherein the pressing device is arranged on the main ram, wherein the forming device comprises a transport carriage, which can move, particularly, on guides or tracks or bars, wherein the forming device can move perpendicularly to the pressing direction of the main ram and/or along the width or length of the abutment, and wherein the main ram is connected with the transport carriage by structural elements in such a way that the main ram can move along with the transport carriage perpendicularly to the pressing direction of the main ram and/or along the width or length of the abutment.

To be able to move the main ram easily with a conveyor belt, it can be foreseen that the main ram is arranged so that it can slide on guides, tracks and/or bars on the transport carriage in the pressing direction of the main ram.

Displacement of the main ram and thereby the pressing procedure of the rings or the displacement of the press ram, of the displacement rod, of the centering ring and of the cut-out ring can be ensured in compact and simple manner by having the main ram moveable in its pressing direction by means of a power drive mounted on the transport carriage, wherein the main ram is connected with the power drive, particularly by a crank drive.

To be able to move the pressing device, the centering ring, the displacement rod, the cut-out ring and/or the press ram easily, it can be provided that the pressing device, the centering ring, the displacement rod, the cut-out ring and/or the press ram are moveable by a cam gear, or electromechanically or pneumatically or hydraulically.

To be able to configure the different forms of the dough piece, it can be arranged that the contour of the centering ring and/or of the press ram (4) and/or of the displacement rod or cut-out ring is of rotation-symmetrical, star-shaped, oval or other shape.

Other advantages and configurations of the present teaching can be seen from the description and the associated drawings.

The present teaching is depicted schematically hereinafter in the drawings with reference to especially advantageous embodiments, which however are not to be considered restrictive, and is described by way of examples with reference to the drawings.

DETAILED DESCRIPTION

Figure 1:
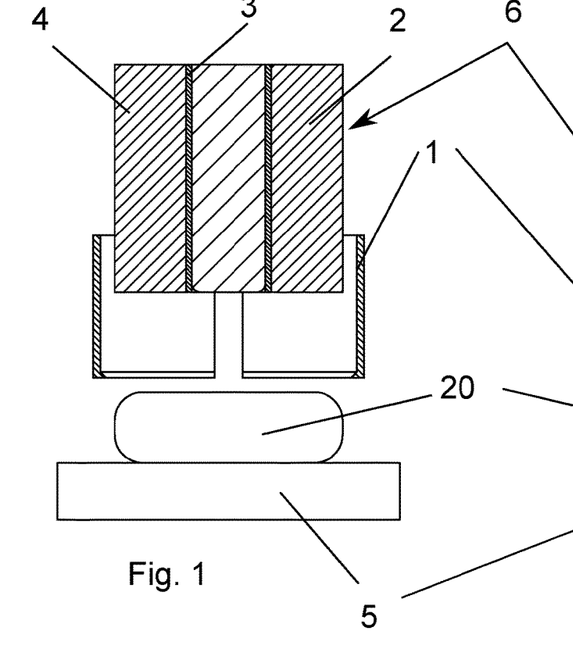
FIG. 1 through FIG. 6 show a first embodiment of the inventive device.
Figure 2:
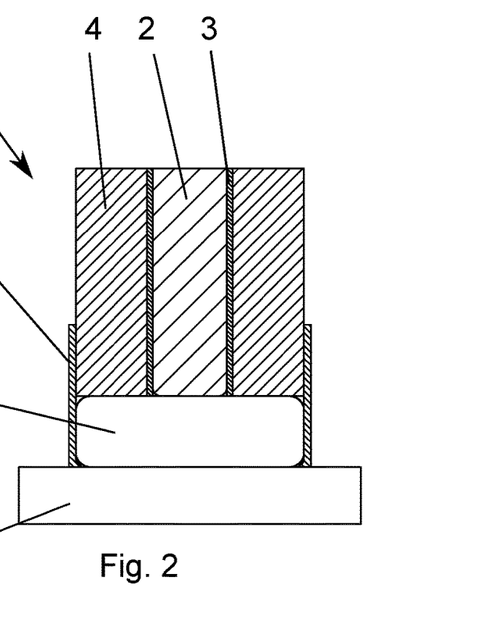

Shown in FIG. 1 through FIG. 6 is a first embodiment of the inventive forming device 10 in different processing conditions in the forming of the dough ring. The forming device 10 includes an abutment 5, on which a mass portion, in the present embodiment a dough piece 20, is mounted. The forming device 10 further includes a pressing device 6, under which the dough piece 20 is positioned. The pressing device 6 comprises a multi-part centering ring 1 and a press ram 4. The press ram 4 is positioned above the dough piece 20 at a distance from the abutment 5 and can be moved in the direction of the abutment 5 perpendicularly to the mounting surface of the abutment 5, on which the dough piece is mounted, so that the distance between the abutment 5 and the press ram 4 is reduced or enlarged. The pressing device 6 further comprises a displacement rod 2, which is arranged in a recess 41 of the press ram 4 and likewise can be moved in the displacement direction of the press ram 4 in the direction perpendicular to the mounting surface of the abutment 5 in the recess 41 of the press ram 4. The press ram 4 and the displacement rod 2 in this embodiment are configured in cylindrical form, but can also comprise other forms. Arranged between the press ram 4 and the displacement rod 2 is a cut-out ring 3, which is configured in the form of a hollow cylinder and, in the embodiment of FIG. 1 through FIG. 6, is arranged surrounding the displacement rod 2, between it and the press ram 4. In this embodiment, the centering ring 1 consists of two parts, which can be displaced between an open position, in which the two parts are at a distance perpendicular to the displacement direction of the press ram 4 (FIG. 1), and a closed position, in which the two halves or parts of the centering ring 1 are contiguous, touching one another (FIG. 2). As shown in the embodiment of FIG. 1 through FIG. 6, the centering ring 1 can optionally be configured, in addition, as movable with the press ram 4 or the pressing device 6 in the displacement direction of the press ram 4, wherein the distance between the abutment 5 and the centering ring 1, in addition, can be modified. In the embodiment of the forming device 10 shown in FIG. 1 through FIG. 6, the centering ring 1, the displacement rod 2, the cut-out ring 3 and the press ram 4 are arranged concentrically to one another in the axis of the recess 41 of the press ram 4.

Alternatively, it can be foreseen that the centering ring 1 is also of one-part configuration and can be displaced in the motion direction of the press ram 4. Thus the centering ring 1 can, for example, be placed on the abutment 5 so that the centering ring 1 surrounds the dough piece and then the press ram 4 is placed on the dough piece 20 and is re-formed to be approximately cylindrical in the first step 1).

Hereinafter, a preferred embodiment of the inventive method, which should not be considered restrictive, is explained with reference to the forming device 10 of FIG. 1 through FIG. 6.

As shown in FIG. 1, a dough piece 20 is placed on the abutment 5 opposite or under the pressing device 6, the pressing device 6 being positioned at a distance from the abutment 5 so that a free space is left between the press ram 4, the displacement rod 2, the cut-out ring 3, the centering ring 1 and the abutment 5.

In a first step a) the centering ring 1 is placed on the abutment 5 and the dough piece 20 is laterally enclosed by the centering ring 1, wherein the centering ring 1 is moved from the opened position (FIG. 1), in which the parts of the centering ring 1 are at a distance from one another in a direction perpendicular to the direction of motion of the press ram 4, into the closed position, in which the parts of the centering ring 1 are touching one another. In the closed position the centering ring 1 laterally blocks the dough piece, pre-determining the diameter of the dough piece 20. After closing the center ring 1, the press ram 4 is placed on the dough piece 20 with the displacement rod 2 and the cut-out ring 3, so that pressure from the press ram 4 is applied against the abutment 5 onto the dough piece 20. The dough piece 20 is pressed into an approximately cylindrical form with uniform thickness by the pressure of the press ram 4, and the mass of the dough piece 20 is equalized, achieving a uniform thickness and distribution of the dough inside the dough piece 20 (FIG. 2).

In a second step b) (FIG. 3), the displacement rod 2 together with the cut-out ring 3 is moved farther in the direction of the abutment 5, so that the displacement of the dough of the dough piece 20 occurs in the center of the cylindrically pre-formed dough piece 20 and the dough of the dough piece 20 is laterally displaced. The distance of the displacement rod 2 and of the cut-out ring 3 to the abutment 5 is reduced, whereby the displacement rod 2 and the cut-out ring 3 are not completely pressed onto the abutment 5, but instead a small distance remains between the abutment 5 and the displacement rod 2 as a so-called thin core 22 of the dough piece 20.

Figure 3:
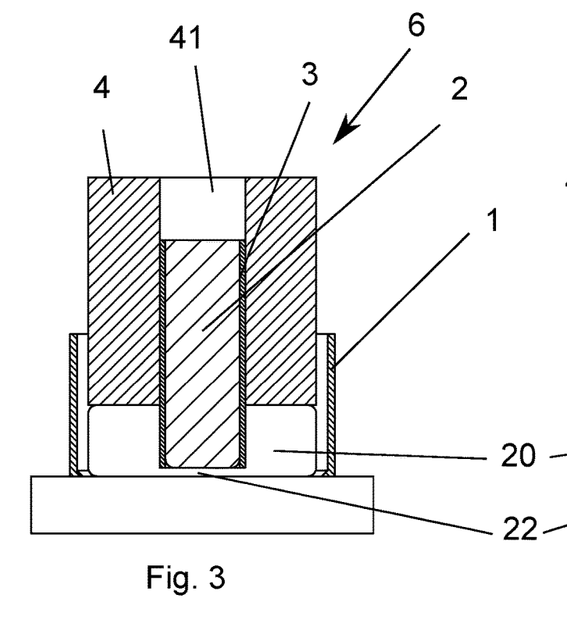

As a result of the penetration of the displacement rod 2 into the dough piece 20, a core hole 21, centrally arranged in the dough piece, is formed, which then gives the characteristic ring shape to the completely formed dough ring. By the displacement of the dough out of the core hole 21 by means of the displacement rod 2, it becomes possible for the dough piece 20 to receive a closed skin, that is, a closed, homogeneous surface in the area of the core hole 21, and thus, with the later deep frying or further processing of the formed dough rings, oil or grease is prevented from penetrating into the dough of the dough ring.

In a third step c) (FIG. 4), then, the cut-out ring 3 is pressed completely onto the abutment 5 and thus the core 22 left behind in the second step b) is separated from the dough piece 20 and the skin in the area of the core 22 is closed off from the dough piece 20.

In a fourth step d) (FIG. 5 and FIG. 6), then, the press ram 4 is lifted off the formed dough ring and the centering ring 1 is again opened from the closed position. Next, the pressing device 6, that is, the press ram 4, the displacement rod 2, the cut-out ring 3 and alternatively the centering ring 1, is lifted off the abutment 5 and then the formed dough ring is extracted or removed from the forming device 10.

Figure 4:
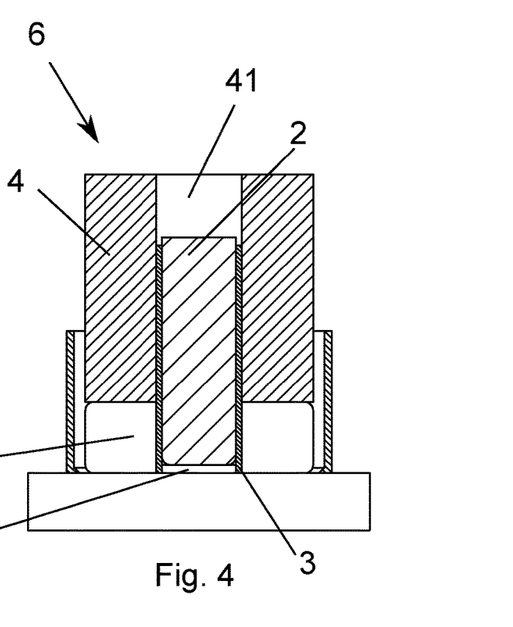
Figure 5:
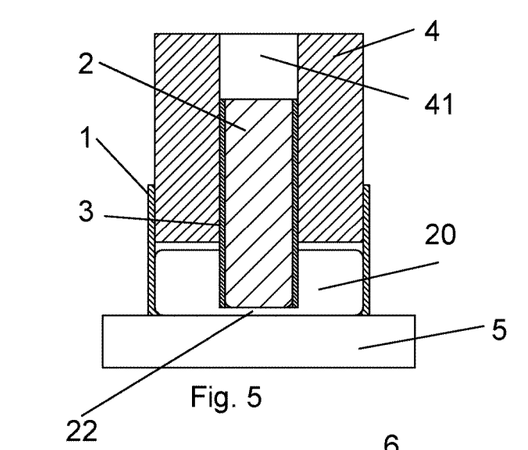

As depicted in FIG. 3 and FIG. 4, during the second step b), that is, the displacement of the dough of the dough piece 10 by the displacement rod 2, the centering ring 1 can optionally open in steps, so that space is released for the dough, into which the dough displaced by the displacement rod 2 can flow, so that the uniform thickness and distribution of the dough inside the dough piece 20 or of the formed dough ring can be maintained, without the dough of the dough piece 20 being thickened. Alternatively as depicted in FIG. 5 it can be foreseen that, in displacing the dough by means of the displacement rod 2, the press ram 4 is easily lifted off the dough piece 20, instead of the centering ring 1, and the displaced dough thus flows or can be displaced into the space freed up by the press ram 4.

Figure 6:
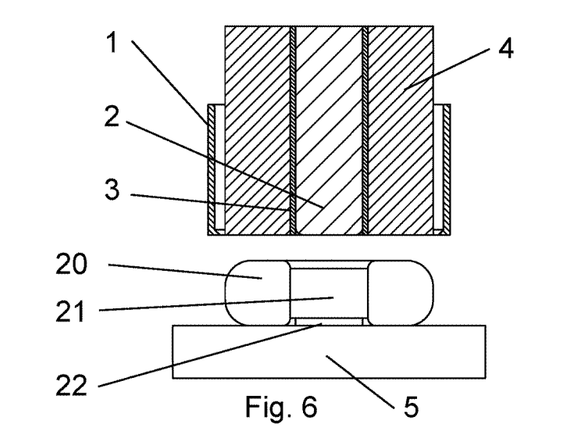

As depicted in FIG. 6, the cut-out core can remain inside the core hole 21 of the formed dough ring or of the dough piece 20 and, after the dough ring has been removed from the forming device 10, can be disposed of or likewise removed.

Figure 7:
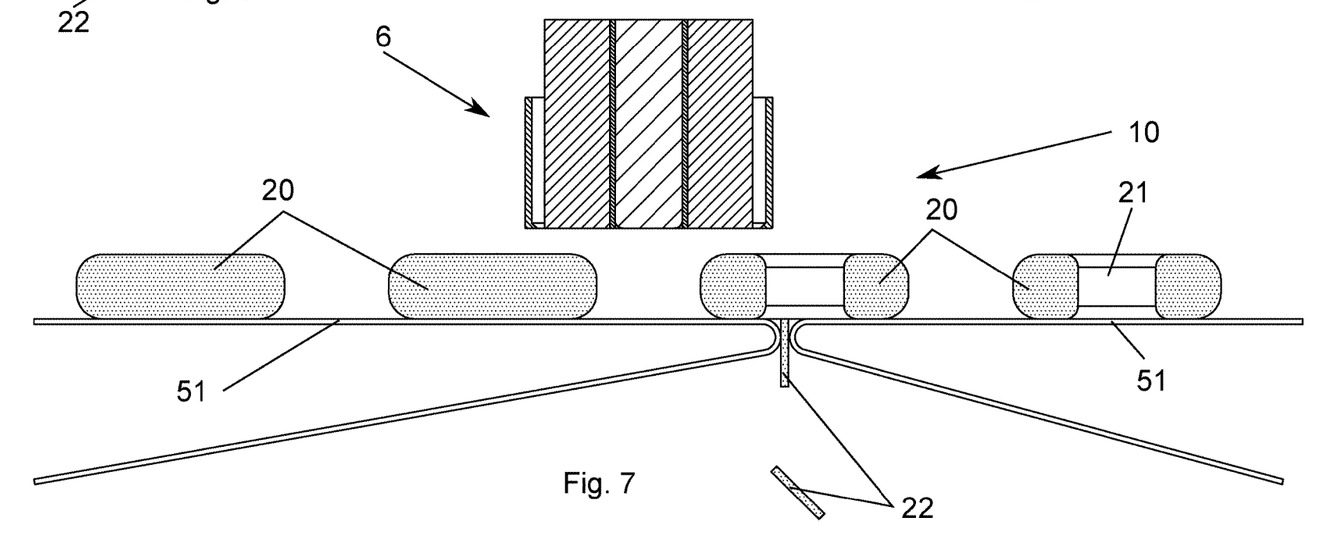
FIG. 7 shows an alternative depiction of the core.

Another embodiment of the inventive method and of the inventive forming device 10 is depicted in FIG. 7. Thus the abutment 5 is configured as a conveyor belt 51, so that the dough pieces 20 are brought in steps under the pressing device 6 by means of the conveyor belt 51 and are re-shaped into dough rings. The conveyor belt 51 running under the pressing device 6 in the transport direction of the dough piece 20, then transfers the formed dough ring, along with the pressing device 6, to a second conveyor belt 51, so that the conveyor belts 51 in each case are arranged at a distance from one another, so that the core 22 of the dough piece 20 or of the formed dough ring can be removed from the formed dough ring into the gap or the space between the conveyor belts 51.

Figure 8:
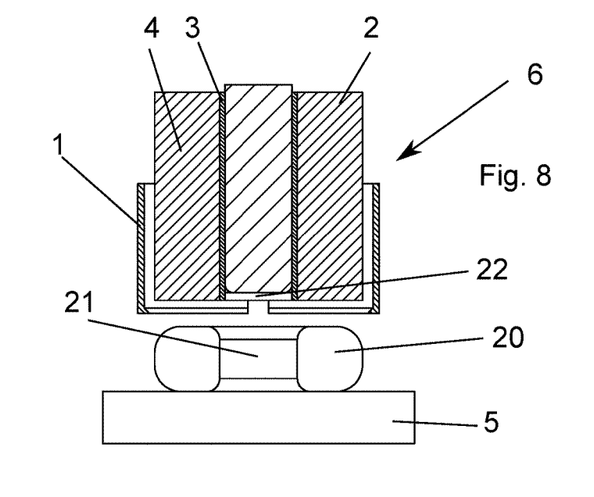
FIG. 8 and FIG. 9 show an embodiment of the inventive method in which the core of the dough piece is lifted into the cut-out ring.
Figure 9:
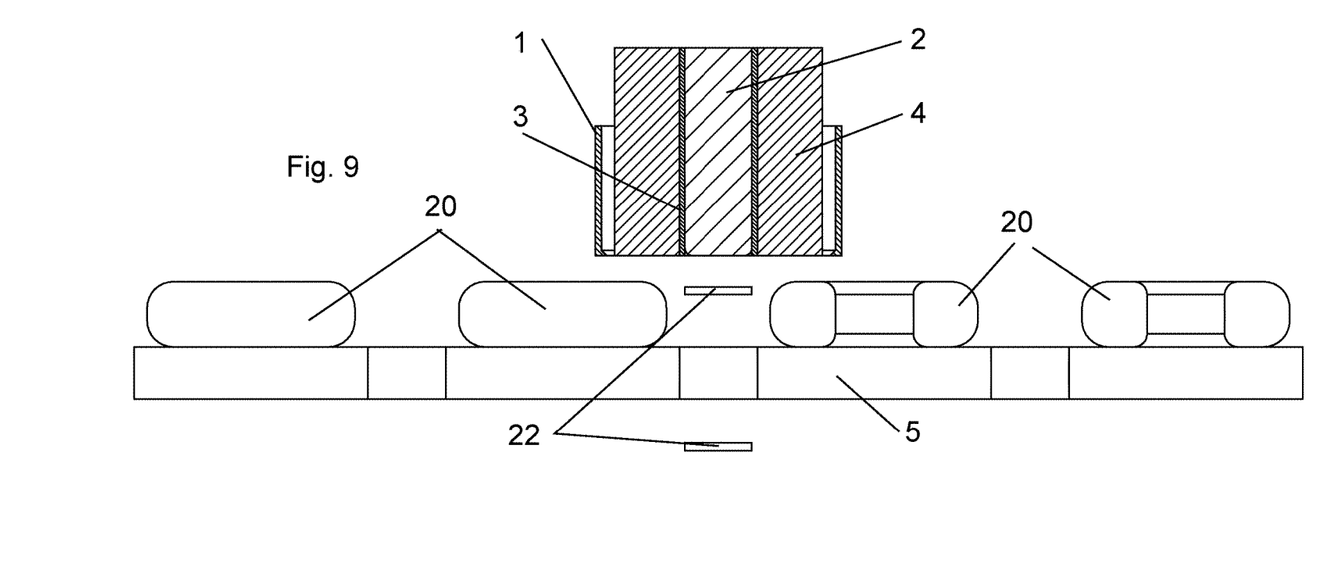

Alternatively it can also be foreseen that as depicted in FIG. 8 and FIG. 9 the core 22 remains in the cut-out ring 3 and can be removed with it or with the pressing device 6 from the abutment 5. Optionally, the cut-out core can then be ejected into recesses foreseen for the purpose, for example holes configured in a conveyor belt 51 (FIG. 9).

Figure 11:
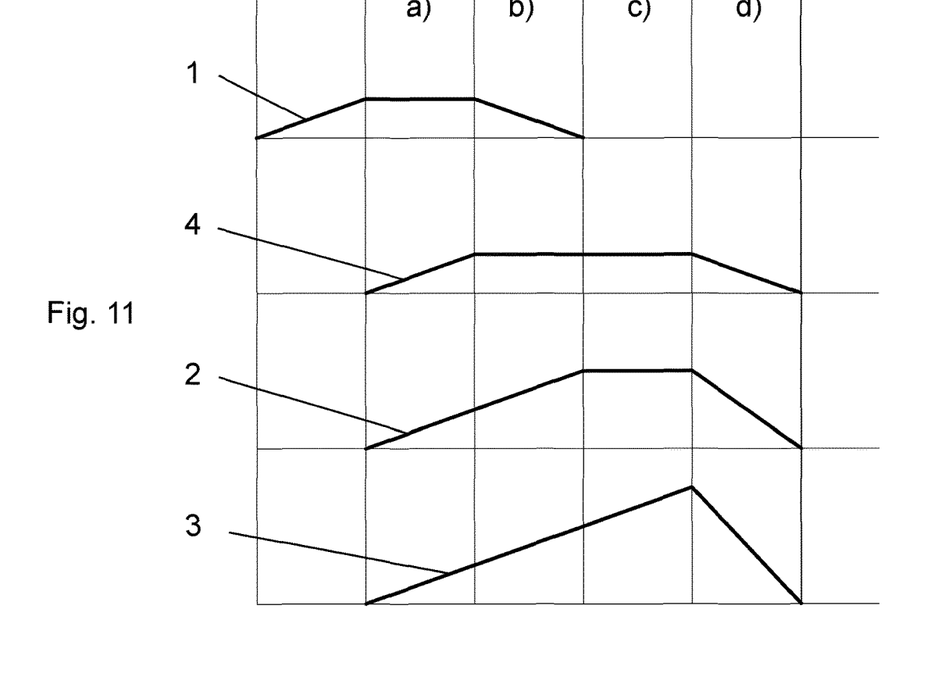
FIG. 11 shows a flow diagram of the course of the parts of the pressing device of an embodiment of the inventive method.

FIG. 11 illustrates an embodiment of the inventive method in a flow diagram. The flow diagram shows the motions of the centering ring 1, press ram 4, displacement rod 2 and punching ring 3, depending on the method's individual steps a), b), c) and d). In the method's first step a) the centering ring 1 is placed on the abutment 5 (FIG. 1) and is continuously closed, from the opened to closed position (FIG. 2). As soon as the centering ring 1 is closed, the press ram 4, displacement rod 2 and cut-out ring 3 are moved in the direction of the abutment 5 and, as described above, effect the formation of the dough piece 20 into an approximately cylindrical dough piece (FIG. 2). In the second step b) the press ram 4 is halted and the displacement rod 2 and cut-out ring 3 are pressed further into the dough of the dough piece 20, so that the core hole 21 is formed (FIG. 3). At the end of the second step b), if the displacement rod 2 reaches the desired distance from the abutment 5, the latter is halted and the cut-out ring 3 is further displaced in the third step c), so that the core 22 is punched out of the dough piece 20 (FIG. 4). After completion of the punch-out process or third step c), the cut-out ring 3, displacement rod 2 and press ram 4 are again lifted off the dough piece 20 and thus the fully formed dough ring is then removed from the forming device 10. As depicted in FIG. 11, during the process of displacing the dough out of the core hole 21 analogously to FIG. 3 and FIG. 4, the centering ring 1 can be opened and thus space is freed up for the dough. This is depicted in FIG. 11 by the return of the centering ring 1 to the starting position in step b), wherein the centering ring 1 lingers in the opened position in steps c) and d), the third and fourth steps.

Figure 12:
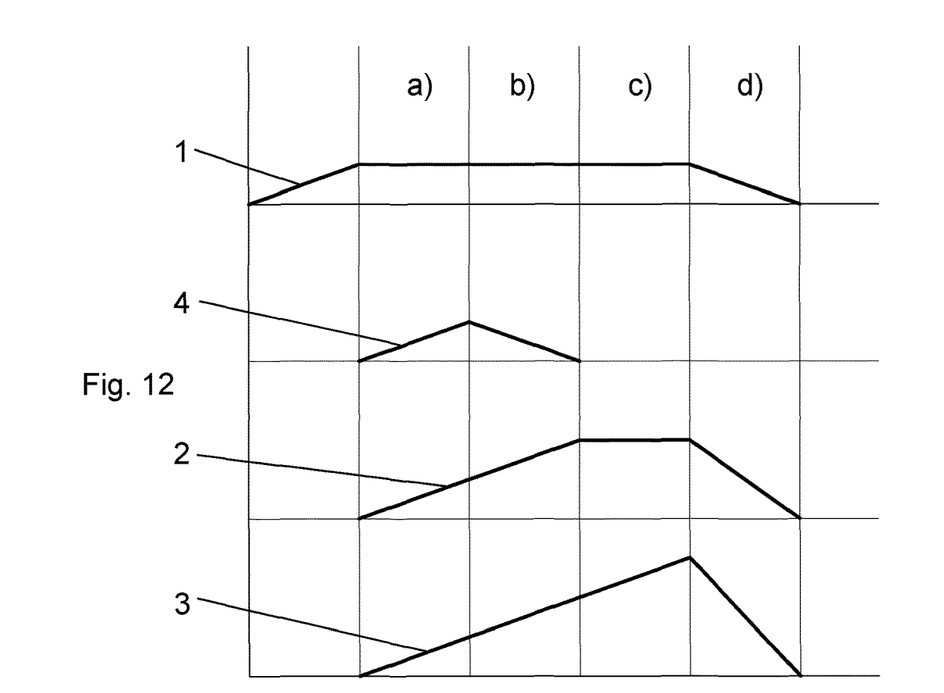
FIG. 12 shows a flow diagram of the course of the parts of the pressing device of an additional embodiment of the inventive method.

Alternatively as depicted in FIG. 12 analogously to FIG. 5, during the displacement process or the second and third steps b) and c), the press cam 4 can be raised or returned to the starting position, thus freeing up space for the dough of the dough piece 20, wherein the centering ring 1 remains halted in the closed position until the end of the third step c) and then in the fourth step d) is brought into the starting position with the displacement rod 2 and the cut-out ring 3.

Flat-pressed, pre-pressed or spherical-shaped dough pieces 20, for example, can be placed in the forming device 10 and then formed into round rings of raw dough. Thus, for example, doughnuts, bagels, choux pastry rings, cinnamon rings and other dough pieces can be produced and/or the raw-dough bases for these dough pieces can be produced.

A preferred embodiment of the method foresees the configuration of the abutment 5 as a conveyor belt 51, on which the dough piece 20 is continuously moved along during the re-forming by the forming device or the pressing device 6, wherein the pressing device 6, that is, the press ram 4, centering ring 1, displacement rod 2 and cut-out ring 3 together are moved at the speed of the conveyor belt 51. Thus, for example, industrial production on conveyor belts becomes possible, wherein single dough pieces (20) are transported in steps (FIG. 10) under the pressing device 6 by means of the conveyor belt 51 and are further transported during the pressing procedure with the conveyor belt 51, together with the pressing device 6. On completion of the pressing procedure, the pressing device 6 is then moved back contrary to the direction of motion of the conveyor belt 51 and positioned over the next dough piece 20 and the pressing procedure starts again.

Figure 10:
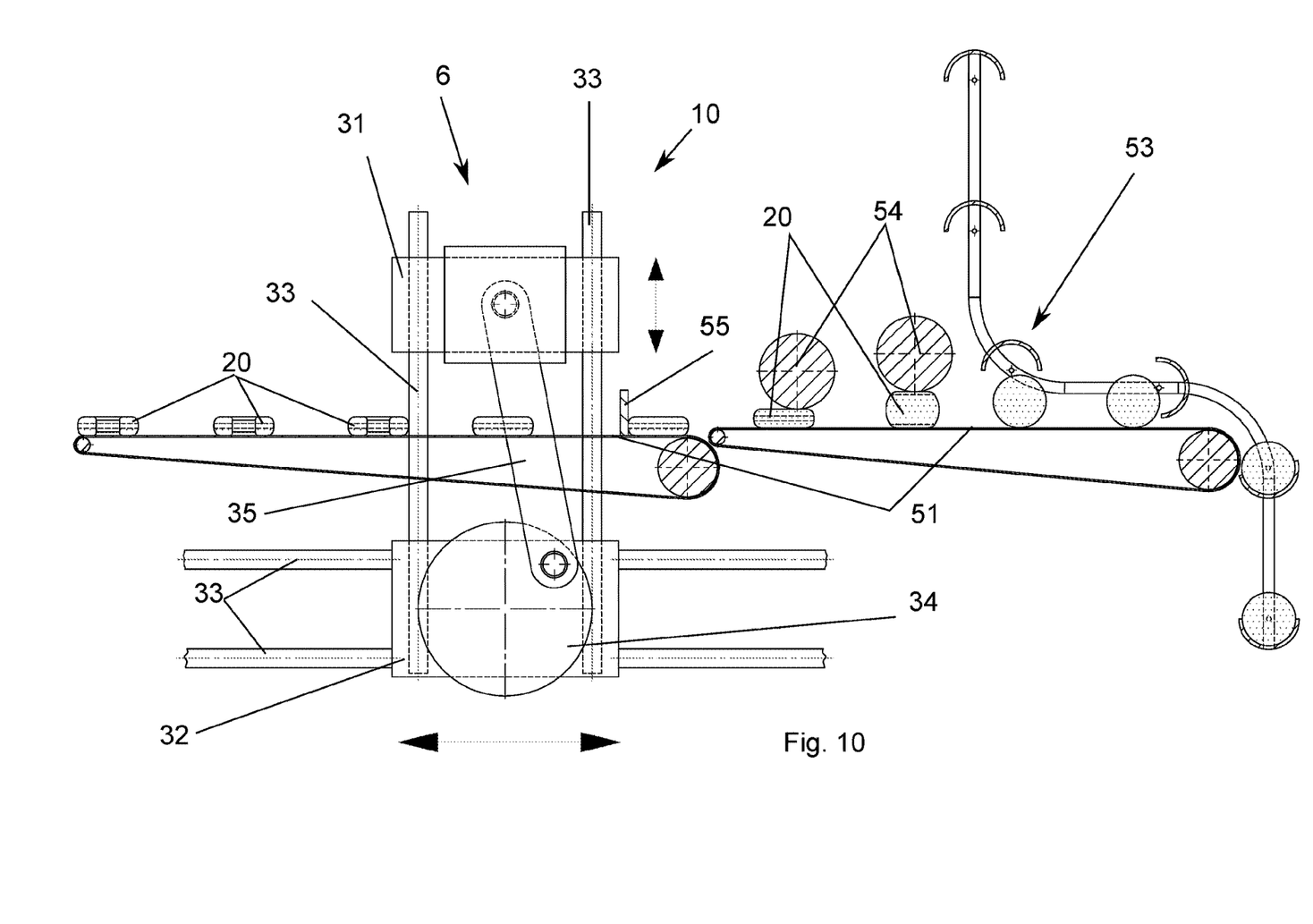
FIG. 10 shows a second embodiment of the inventive device with different processing conditions of the dough piece.

FIG. 10 depicts an additional embodiment of the inventive forming device 10. By means of a first conveyor belt 51, dough in the form of dough balls is placed by means of a transport device 53 onto the first conveyor belt 51 and pre-formed into a cylindrical shape by means of moulding rollers 54. On completion of the re-shaping, the dough piece 20 is transferred from the first conveyor belt 51 onto a second conveyor belt 51, and the latter is pre-positioned, for example by means of an advancing device. The abutment 5 configured as a second conveyor belt 51 next moves the pre-positioned dough piece 20 into the region of the pressing device 6, and the forming process then begins. The forming device 10 comprises a main ram 31, which is arranged so that it can be moved on guides or rods 33 in the direction of the abutment 5 or conveyor belt 51. The pressing device 6 with the centering ring 1, press ram 4, displacement rod 2 and cut-out ring 3 is positioned on the main ram 31. In addition, the forming device 10 comprises a transport carriage 32, on which the main cam 31 or the guides or rods 33 are affixed or arranged. The transport carriage 32 can be moved along the motion direction of the conveyor belt 51, for example on guides or rods 33, so that the pressing device 6 can be moved together with the transport carriage 32 and the conveyor belt 51. It is thus possible, during transport of the dough pieces 20, to move them or advance them together on the conveyor belt 51 before or after the re-shaping procedure, and thus to achieve simple industrial production with continuous advancement of the individual dough pieces. As depicted in FIG. 10, the main ram 31 can be moved in the direction of the abutment 5 or of the conveyor belt 51 by means of a power drive 34 mounted on the transport carriage 32, wherein the drive 34 alternatively, as illustrated in FIG. 10, is displaced by a crank drive or other moving devices known in the prior art such as electromechanical motors or spindles or pneumatic or hydraulic cylinders.

In an optional arrangement, the pressing device 6 can comprise a cam gear or other electromechanical moving devices by which the centering ring 1, the displacement rod 2, the cut-out ring 3 and the press ram 4 can be moved independently of one another.

In an additional option, the abutment 5 can be configured as a conveyor belt 51, a transport bar or a pressure cup or as a number of transport bars, pressure cups or as a multi-surface transport drum. Thus, for example, the pressing procedure can also be conducted against a transport drum, which keeps rotating, continuously or pulsed, after completion of the pressing process.

In addition, for mass production or the production, several dough pieces in parallel, a number of pressing devices 6, each of identical configuration, can be arranged along the length and/or width of the abutment 5 or in particular along the length and/or width of the conveyor belt 51, to form several dough rings from the dough pieces 20 in a parallel arrangement.

Instead of the described dough rings or doughnuts, it is also possible to produce bagels, choux pastry rings, cinnamon rings and other round raw-dough rings by means of the inventive method and the device 10. Alternatively, the shape of the formed dough pieces can be square, that is, for example, square-shaped, cube-shaped or of other shapes.

Another alternative is for the press cam 4 to move in synchronization with the displacement rod 2 as well as the cut-out ring 3, so that the mass portion 20 is formed into a disk.

Alternatively, other mass portions, instead of dough pieces 20, can be the basis for the re-shaping process.

Alternatively, the contour of the centering ring 1 and/or of the press cam 4 and/or of the displacement ring 2 or of the cut-out ring 3 can comprise rotation-symmetrical, star-shaped, oval or other shapes. Thus, for example, a star-shaped dough piece can be produced or else other shapes can be configured with the dough piece.

Alternatively to the shown embodiments, the pressing device 6 can be configured as a drum shaper which is rotated at the same speed as the conveyor belt 51. In this case, several pressing devices 6, for example, can be integrated in a drum shaper and thus several dough pieces 20 are processed simultaneously either parallel or subsequent to one another.

In another alternative plan the core is pulled in by a suction device or drawn off the conveyor belt 51 or out of the pressing device 6 or is ejected by a belt strap or the conveyor belt 51.

Alternatively to the described embodiments, the dough pieces 20 or raw rings can be cut out by the pressing device 6 or separate cut-out elements from a dough strip moved on the conveyor belt 51, and can then be reshaped by the pressing device 6.

What is claimed is:

1. A method for forming rings from dough or other masses, wherein a mass portion is positioned under a pressing device, wherein the pressing device has a centering ring, a displacement rod, a cut-out ring and a press ram, wherein the ring is formed in accordance with the following steps:
   wherein in a first step a) the centering ring is placed on an abutment, wherein the mass portion is laterally enclosed by the centering ring and is pressed by the press ram against the abutment into an approximately cylindrical form with a uniform thickness,
   wherein in a second step b) a core hole is made in the mass portion by the displacement rod, wherein the displacement rod penetrates into the mass portion to a lower value than the thickness of the mass portion pre-pressed in the first step a), so that a thin core of the mass portion remains between the abutment and the displacement rod,
   wherein in a third step c) the core is punched out by the cut-out ring, and
   wherein in a fourth step d) the press ram is lifted off the mass portion formed into a ring.

2. The method according to claim 1, wherein in the second step b), during the penetration of the displacement rod the centering ring is continuously opened and/or the press ram is continuously withdrawn, so that the displaced volume of the mass portion is displaced into the space freed by the centering ring.

3. The method according to claim 1, wherein in the third step c) the core is lifted into the cut-out ring or that the core is removed into a gap situated between two conveyor belts, placed at a distance from one another, after being punched out of the completely formed ring, or that the core is pulled in by a suction device or is ejected by a belt strap.

4. The method according to claim 1, wherein the abutment is configured as a conveyor belt on which the dough piece is transported during the forming process, wherein the pressing device is propelled with the conveyor belt at its speed, or that the pressing device is configured as a drum former and is rotated at the speed of the conveyor belt.

5. The method according to claim 1, wherein the mass portions formed according to the method are round piping rings, wherein the mass portions inserted into the forming device are flat-pressed or pre-pressed or spherical-shaped mass portions and/or that the press ram is moved in synchronization with the displacement rod as well as the cut-out ring, so that the mass portion is formed into a disk.

* * * * *